US012414211B2

(12) United States Patent
Li et al.

(10) Patent No.: US 12,414,211 B2
(45) Date of Patent: Sep. 9, 2025

(54) POWER CONTROL CIRCUIT AND DIMMING CONTROL CIRCUIT

(71) Applicant: Torshare Ltd, Guangdong (CN)

(72) Inventors: Mantie Li, Guangdong (CN); Xuanzhi Li, Guangdong (CN); Jian Peng, Guangdong (CN); Shanglong Wu, Guangdong (CN)

(73) Assignee: Torshare Ltd, Shenzhen (CN)

( * ) Notice: Subject to any disclaimer, the term of this patent is extended or adjusted under 35 U.S.C. 154(b) by 141 days.

(21) Appl. No.: 18/374,158

(22) Filed: Sep. 28, 2023

(65) Prior Publication Data

US 2025/0040012 A1 Jan. 30, 2025

(30) Foreign Application Priority Data

Jul. 27, 2023 (CN) ........................ 202310933338.1

(51) Int. Cl.

*H05B 45/30* (2020.01)
*H05B 45/10* (2020.01)
*H05B 45/20* (2020.01)
*H05B 45/34* (2020.01)
*H05B 45/37* (2020.01)

(52) U.S. Cl.

CPC ............. *H05B 45/34* (2020.01); *H05B 45/10* (2020.01); *H05B 45/20* (2020.01); *H05B 45/37* (2020.01)

(58) Field of Classification Search

CPC ........ H05B 45/10; H05B 45/14; H05B 45/20; H05B 45/24; H05B 45/30; H05B 45/34; H05B 45/345; H05B 45/37; H05B 45/3725; H05B 45/375; H05B 45/38; H05B 45/39

See application file for complete search history.

(56) References Cited

U.S. PATENT DOCUMENTS 9,730,290 B2 * 8/2017 Lee ........................ H05B 45/14
2009/0129048 A1 * 5/2009 Wang ..................... H05B 45/14
362/23.03

* cited by examiner

*Primary Examiner* — Long Nguyen

(57) ABSTRACT

The present invention provides a power control circuit and a dimming control circuit, the circuit includes: a power supply voltage stabilizing circuit, a power adjusting circuit, and an output circuit; the power supply voltage stabilizing circuit is configured to convert a power supply voltage of the voltage source into an input voltage of a preset voltage value, and transmit the input voltage to the power adjusting circuit; the power adjusting circuit is configured to convert the input voltage into an output voltage of a preset power by adjusting a voltage division ratio of the voltage division resistor; the output circuit is configured to operationally amplify and follow the output voltage, and output a brightness control voltage. Using the embodiments of the present invention, power adjustment of the output voltage can be achieved, thereby satisfying the power match for different dimming interfaces.

15 Claims, 4 Drawing Sheets

POWER CONTROL CIRCUIT AND DIMMING CONTROL CIRCUIT

CROSS REFERENCE TO RELATED APPLICATIONS

The present application claims the benefit of Chinese Patent Application No. 202310933338.1 filed on Jul. 27, 2023, the contents of which are incorporated herein by reference in their entirety.

FIELD OF THE INVENTION

The present invention relates to the field of electronic circuit technology, particularly to a power control circuit and a dimming control circuit.

BACKGROUND OF THE INVENTION

In the current market, existing solutions for adjusting power and color temperature basically adjust the driver's output power by utilizing the resistance in the driver's three-in-one dimming interface, which involves 0-10V dimmer dimming, PWM dimming, and adjustable resistance dimming. However, the drawback of these solutions is that the internal impedance of dimming interfaces varies among different power supplies, requiring different resistance to achieve the same power output. This results in a high degree of customization for lighting manufacturers and a lack of standardization.

SUMMARY OF THE INVENTION

The present invention provides a power control circuit and a dimming control circuit to solve the technical problem of power matching for different types of dimming interfaces, which is challenging to achieve in the existing technology.

To solve the aforementioned technical problem, an embodiment of the present invention provides a power control circuit, comprising: a power supply voltage stabilizing circuit, a power adjusting circuit, and an output circuit; the power adjusting circuit comprises: a voltage division resistor;

- wherein an input end of the power supply voltage stabilizing circuit is connected to a voltage source, and an output end of the power supply voltage stabilizing circuit is connected to an input end of the power adjusting circuit;
- an output end of the power adjusting circuit is connected to an input end of the output circuit;
- an output end of the output circuit is connected to an LED driver module;
- the power supply voltage stabilizing circuit is configured to convert a power supply voltage of the voltage source into an input voltage of a preset voltage value, and transmit the input voltage to the power adjusting circuit;
- the power adjusting circuit is configured to convert the input voltage into an output voltage of a preset power by adjusting a voltage division ratio of the voltage division resistor;
- the output circuit is configured to operationally amplify and follow the output voltage, and output a brightness control voltage.

The present invention first utilizes the power supply voltage stabilizing circuit to converts the power supply voltage into the input voltage required for controlling the LED light; then adjusts the voltage division ratio of the voltage division resistor in the power adjusting circuit to achieve power adjustment of the output voltage; so as to ensure that the brightness control voltage obtained after operationally amplifying and following the output voltage can satisfy the power match for different dimming interfaces.

Furthermore, the power adjusting circuit comprises: a level control module; wherein the voltage division resistor comprises: a first resistor and a second resistor;

- a first end of the first resistor is the input end of the power adjusting circuit, and a second end of the first resistor is connected respectively to a control end of the level control module and a first end of the second resistor;
- a second end of the second resistor is grounded;
- the control end of the level control module and the first end of the second resistor jointly constitute the output end of the power adjusting circuit;
- the level control module is configured to, in accordance with a user-set level, parallelly connect an external resistor corresponding to the level to the second resistor.

The present invention parallelly connects different external resistors to the second resistor through different levels, so as to achieve the adjustment of voltage division ratio of the voltage division resistor, thereby enabling the output voltage to have different powers to satisfy the power match for different dimming interfaces.

Furthermore, the level control module comprises: a plurality of external resistor branches and a power DIP switch; wherein the external resistor branch comprises: a first external resistor and a second external resistor; the second external resistor is an adjustable resistor;

- wherein a first end of the external resistor branch is the control end of the level control module, a second end of the external resistor branch is connected to the power DIP switch;
- a first end of the first external resistor is the first end of the external resistor branch, and a second end of the first external resistor is connected to the first end of the second resistor;
- an adjustment end of the second resistor is the second end of the external resistor branch.

The present invention achieves the adjustment of voltage division ratio by parallelly connecting external resistor branches to the second resistor, wherein the external resistor branch includes the first external resistor and the second external resistor, and by adjusting the resistance value of the adjustable second external resistor, further power adjustment of the output voltage can be achieved, thereby satisfying the power matching for different dimming interfaces.

Furthermore, the power supply voltage stabilizing circuit comprises: a first voltage stabilizing circuit and a second voltage stabilizing circuit; wherein the second voltage stabilizing circuit comprises: a first switching tube, a third resistor, and an expansion circuit;

- an input end of the first voltage stabilizing circuit is the input end of the power supply voltage stabilizing circuit, and an output end of the first voltage stabilizing circuit is connected to an input end of the second voltage stabilizing circuit;
- an output end of the second voltage stabilizing circuit is the output end of the power supply voltage stabilizing circuit;

a first end of the first switching tube is connected to a first end of the third resistor, and the first end of the first switching tube is the input end of the second voltage stabilizing circuit;

a second end of the third resistor is connected to a control end of the first switching tube;

the control end of the first switching tube is connected to an output end of the expansion circuit;

a second end of the first switching tube is the output end of the second voltage stabilizing circuit;

the first voltage stabilizing circuit is configured to convert the power supply voltage of the voltage source into a reference voltage, and transmit the reference voltage to the second voltage stabilizing circuit;

the second voltage stabilizing circuit is configured to convert the reference voltage into an input voltage of a preset voltage value;

the expansion circuit is configured to adjust the voltage value of the input voltage based on an environmental factor around the power control circuit.

The present invention adjusts and controls the voltage at the control end of the first switching tube through the expansion circuit, so that after the first voltage stabilizing circuit converts the power supply voltage into the reference voltage, the expansion circuit determines the voltage value of the input voltage that the reference voltage is converted into, thereby changing the power adjustment range of the input voltage in the power adjusting circuit.

Furthermore, the expansion circuit comprises: a first diode, a second diode, and an external sensor module;

wherein an anode of the first diode is connected to the output end of the expansion circuit, and a cathode of the first diode is connected respectively to the external sensor module and a cathode of the second diode;

an anode of the second diode is grounded;

the external sensor module is configured to adjust the voltage value at the cathode of the first diode based on an environmental factor; the environmental factor comprises one or a combination of the following: pressure, temperature, humidity, and volume.

The present invention adjusts and controls the voltage at the control end of the first switching tube through the expansion circuit, so that after the first voltage stabilizing circuit converts the power supply voltage into the reference voltage, the external sensor module, in combination with the first diode clamp, determines the voltage value of the input voltage that the reference voltage is converted into, thereby changing the power adjustment range of the input voltage in the power adjusting circuit.

Furthermore, the expansion circuit comprises: a third diode, a fourth diode, and a light controller module;

wherein an anode of the third diode is connected to the output end of the expansion circuit, and a cathode of the third diode is connected respectively to the light controller module and a cathode of the fourth diode;

an anode of the fourth diode is grounded;

the light controller module is configured to adjust the voltage value at the cathode of the third diode based on light intensity.

The present invention adjusts and controls the voltage at the control end of the first switching tube through the expansion circuit, so that after the first voltage stabilizing circuit converts the power supply voltage into the reference voltage, the light controller module, in combination with the third diode clamp, determines the voltage value of the input voltage that the reference voltage is converted into, thereby changing the power adjustment range of the input voltage in the power adjusting circuit.

Furthermore, the first voltage stabilizing circuit comprises: a first capacitor, a fourth resistor, a fifth resistor, a sixth resistor, a second switching tube, and a first thyristor;

wherein a first end of the first capacitor is connected respectively to a first end of the second switching tube and a first end of the fourth resistor, jointly constituting the input end of the first voltage stabilizing circuit;

a second end of the first capacitor is grounded;

a control end of the second switching tube is connected respectively to a second end of the fourth resistor and a cathode of the first thyristor;

a second end of the second switching tube is connected to a first end of the fifth resistor, jointly constituting the output end of the first voltage stabilizing circuit;

a gate of the first thyristor is connected respectively to a second end of the fifth resistor and a first end of the sixth resistor, and an anode of the first thyristor is grounded;

a second end of the sixth resistor is grounded.

In the present invention, after receiving the power supply voltage, the first voltage stabilizing circuit first performs filtering through the first capacitor to enhance the stability of circuit operation; then divides the voltage by the fifth resistor and the sixth resistor to provide the preset reference voltage to the gate of the thyristor, and in conjunction with the second switching tube, converts the power supply voltage into the reference voltage of the preset voltage value, so as to achieve the stabilized voltage output; and the fourth resistor prevents excessive current of the second switching tube, further enhancing the stability of circuit operation.

Furthermore, the first voltage stabilizing circuit further comprises: a second capacitor and a third capacitor;

wherein a first end of the second capacitor is connected to the control end of the second switching tube, and a second end of the second capacitor is connected respectively to the second end of the fifth resistor and the first end of the sixth resistor;

a first end of the third capacitor is connected to the second end of the second switching tube, and a second end of the third capacitor is grounded.

The present invention further uses the second capacitor and the third capacitor to respectively achieve the low-pass filtering between the second end and the control end of the second switching tube and the filtering at the output end of the first voltage stabilizing circuit, thereby enhancing the quality of the reference voltage.

Furthermore, the output circuit comprises: a first operational amplifier, a seventh resistor, and a fifth diode;

wherein a non-inverting input end of the first operational amplifier is the input end of the output circuit, and an inverting input end of the first operational amplifier is connected to a first end of the seventh resistor;

a second end of the seventh resistor is connected respectively to an output end of the first operational amplifier and a cathode of the fifth diode, jointly constituting the output end of the output circuit;

an anode of the fifth diode is grounded.

In this invention, the first operational amplifier follows the output voltage through a feedback loop provided by the seventh resistor, and in conjunction with the fifth diode, outputs the brightness control voltage required for the dimming interface.

In another aspect, the embodiments of the present invention further provide a dimming control circuit comprising: a power control circuit as described in the embodiments of the present invention and a color temperature adjusting circuit; wherein the color temperature adjusting circuit comprises: an LED driver module, a cool white LED array, a warm white LED array, and a color temperature DIP switch;

the power control circuit is connected to an input end of the LED driver module through the output end of the output circuit;

a first output end of the LED driver module is connected respectively to a first end of the cool white LED array and a first end of the warm white LED array;

the color temperature DIP switch is connected respectively to a second output end of the LED driver module, a second end of the cool white LED array, and a second end of the warm white LED array.

The present invention first utilizes the power supply voltage stabilizing circuit to converts the power supply voltage into the input voltage required for controlling the LED light; then adjusts the voltage division ratio of the voltage division resistor in the power adjusting circuit to achieve power adjustment of the output voltage; so as to ensure that the brightness control voltage obtained after operationally amplifying and following the output voltage can satisfy the power match for different dimming interfaces.

DETAILED DESCRIPTION OF THE INVENTION

Now with reference to the drawings in the embodiments of the present invention, the technical solutions of the embodiments of the present invention will be described clearly and comprehensively. It is evident that the described embodiments are only a part of the embodiments of the present invention, not all the embodiments. Based on the embodiments of the present invention, any other embodiments obtained by those skilled in the art without creative effort fall within the scope of protection of the present invention.

Figure 1:
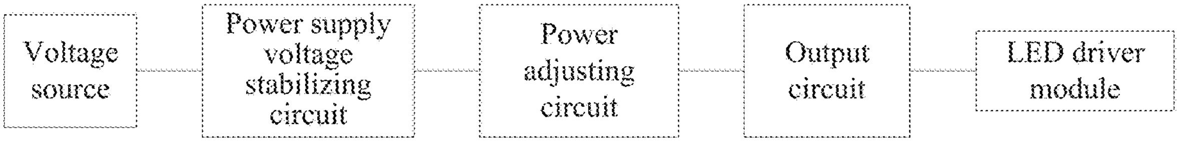
FIG. 1 is a schematic diagram illustrating the structure of a power control circuit according to an embodiment of the present invention.

Please refer to FIG. 1. FIG. 1 is a schematic diagram illustrating the structure of a power control circuit according to an embodiment of the present invention. The power control circuit includes: a power supply voltage stabilizing circuit, a power adjusting circuit, and an output circuit; the power adjusting circuit includes: a voltage division resistor;

wherein an input end of the power supply voltage stabilizing circuit is connected to a voltage source, and an output end of the power supply voltage stabilizing circuit is connected to an input end of the power adjusting circuit;

an output end of the power adjusting circuit is connected to an input end of the output circuit;

an output end of the output circuit is connected to an LED driver module;

the power supply voltage stabilizing circuit is configured to convert a power supply voltage of the voltage source into an input voltage of a preset voltage value, and transmit the input voltage to the power adjusting circuit;

the power adjusting circuit is configured to convert the input voltage into an output voltage of a preset power by adjusting a voltage division ratio of the voltage division resistor;

the output circuit is configured to operationally amplify and follow the output voltage, and output a brightness control voltage.

The present embodiment first utilizes the power supply voltage stabilizing circuit to converts the power supply voltage into the input voltage required for controlling the LED light; then adjusts the voltage division ratio of the voltage division resistor in the power adjusting circuit to achieve power adjustment of the output voltage; so as to ensure that the brightness control voltage obtained after operationally amplifying and following the output voltage can satisfy the power match for different dimming interfaces.

Furthermore, the power adjusting circuit includes: a level control module; wherein the voltage division resistor includes: a first resistor and a second resistor;

a first end of the first resistor is the input end of the power adjusting circuit, and a second end of the first resistor is connected respectively to a control end of the level control module and a first end of the second resistor;

a second end of the second resistor is grounded;

the control end of the level control module and the first end of the second resistor jointly constitute the output end of the power adjusting circuit;

the level control module is configured to, in accordance with a user-set level, parallelly connect an external resistor corresponding to the level to the second resistor.

In this embodiment, the level control module can be adjusted with multiple levels, such as low-power level, medium-power level, and high-power level. After the user sets a specific level, one or more external resistors corresponding to that level are parallelly connected to the second resistor, thereby changing the voltage division ratio of the voltage division resistor. Wherein, the number of levels can be set according to user's needs, with the number of levels≥1. For example, 1-10 levels are set, with each level corresponding to one or a group of external resistors, and the resistance values of each or each group of external resistors are different from each other.

The present embodiment parallelly connects different external resistors to the second resistor through different levels, so as to achieve the adjustment of voltage division ratio of the voltage division resistor, thereby enabling the output voltage to have different powers to satisfy the power match for different dimming interfaces.

Figure 2:
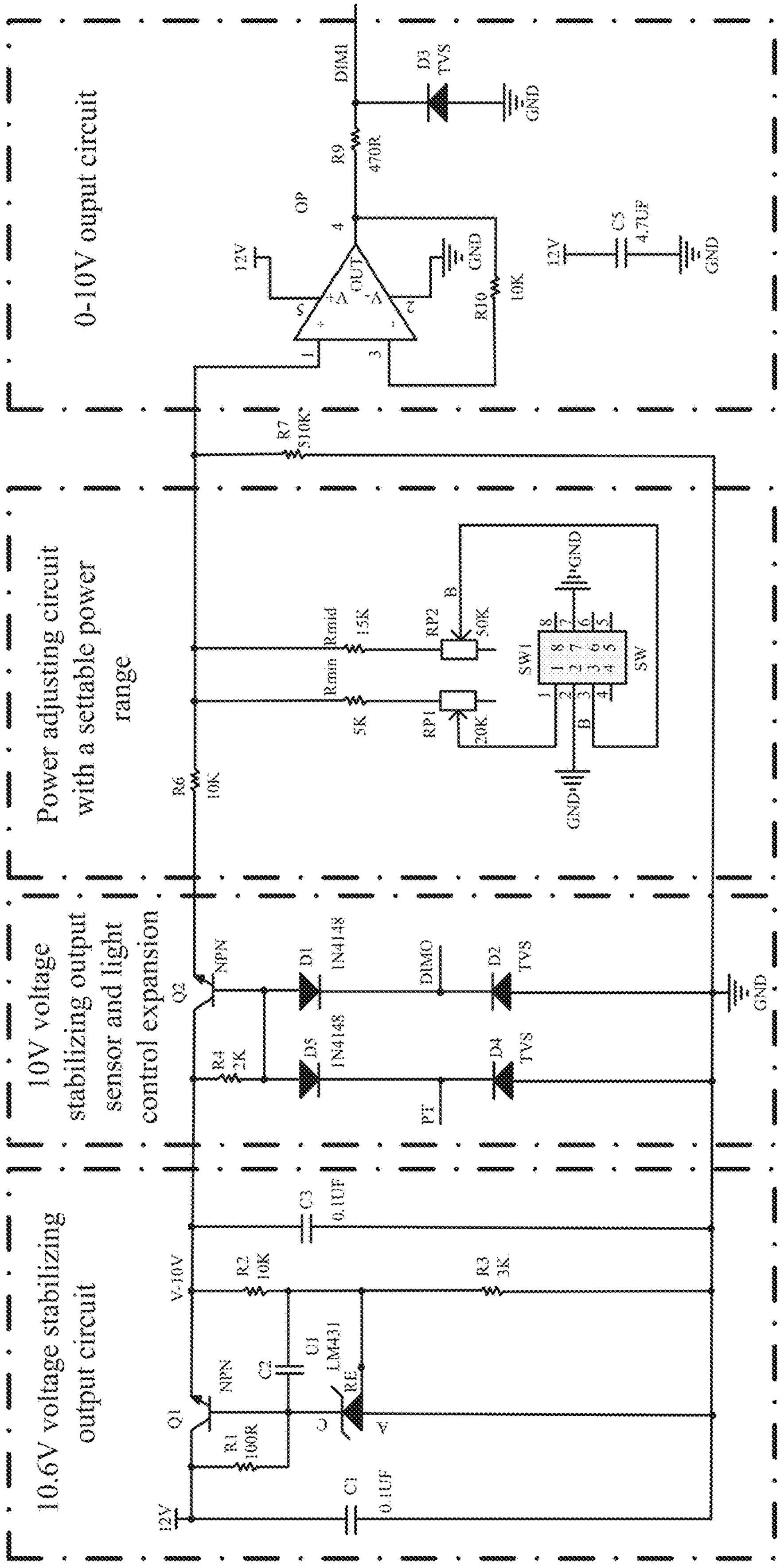
FIG. 2 is a schematic diagram illustrating the connection relationships of a power control circuit according to an embodiment of the present invention.

Please refer to FIG. 2. FIG. 2 is a schematic diagram illustrating the connection relationships of a power control circuit according to an embodiment of the present invention. In this figure, Rmin and Rmid are first external resistor, RP1 and RP2 are second external resistor, the power adjusting circuit with a settable power range is the power adjusting circuit of the present embodiment; the level control module includes: several external resistor branches and a power DIP switch SW1, wherein the external resistor branch includes the first external resistor and the second external resistor; the second external resistor is adjustable resistor;

wherein a first end of the external resistor branch is the control end of the level control module, a second end of the external resistor branch is connected to the power DIP switch SW1;

a first end of the first external resistor is the first end of the external resistor branch, and a second end of the first external resistor is connected to the first end of the second external resistor RP1 and RP2;

an adjustment end of the second external resistor RP1 and RP2 is the second end of the external resistor branch.

In the present embodiment, for the first level: the first external resistor can be chosen as 5 kΩ, and the second external resistor can be chosen as 0-20 kΩ; if the input voltage is 10V, after the voltage division through the 10 kΩ first resistor R6, the first external resistor, and the second external resistor, a voltage of 3.3V-7.14V can be achieved at the non-inverting input end of the operational amplifier, thus realizing a minimum-level adjustable range of 33%-72% of driving power; by adjusting the first resistor R6, the first external resistor, and the second external resistor, other adjustable power ranges can also be achieved; by operationally amplifying and following this voltage, a driving dimming input DIM voltage of 3.3V-7.14V is achieved; wherein the DIM voltage is the brightness control voltage.

In the present embodiment, for the second level: the first external resistor can be chosen as 10 kΩ, and the second external resistor can be chosen as 0-40 kΩ.

In the present embodiment, for the third level: the first external resistor can be chosen as 15 kΩ, and the second external resistor can be chosen as 0-50 kΩ; if the input voltage is 10V, after the voltage division through the 10 kΩ first resistor R6, the first external resistor, and the second external resistor, a voltage of 6V-8.67V can be achieved at the non-inverting input end of the operational amplifier, thus realizing a minimum-level adjustable range of 60%-86.7% of driving power; by adjusting the first resistor R6, the first external resistor, and the second external resistor, other adjustable power ranges can also be achieved; by operationally amplifying and following this voltage, a driving dimming input DIM voltage of 3.3V-7.14V is achieved.

In the present embodiment, when the power DIP switch SW1 is turned to the maximum level: after the voltage division through the first resistor R6 and the second resistor R7, the output voltage is directly outputted to the operational amplifier in the output circuit, and the power is at the maximum power.

The present embodiment parallelly connects external resistor branch to the second resistor, so as to achieve the adjustment of voltage division ratio, wherein the external resistor branch includes the first external resistor and the second external resistor, and by adjusting the resistance value of the adjustable second external resistor, further power adjustment of the output voltage can be achieved, thereby satisfying the power matching for different dimming interfaces.

Please refer to FIG. 2. FIG. 2 is a schematic diagram illustrating the connection relationships of a power control circuit according to an embodiment of the present invention. The power supply voltage stabilizing circuit includes: a first voltage stabilizing circuit and a second voltage stabilizing circuit; wherein the second voltage stabilizing circuit includes: a first switching tube Q2, a third resistor R4, and an expansion circuit;

an input end of the first voltage stabilizing circuit is the input end of the power supply voltage stabilizing circuit, and an output end of the first voltage stabilizing circuit is connected to an input end of the second voltage stabilizing circuit;

an output end of the second voltage stabilizing circuit is the output end of the power supply voltage stabilizing circuit;

a first end of the first switching tube Q2 is connected to a first end of the third resistor R4, and the first end of the first switching tube Q2 is the input end of the second voltage stabilizing circuit;

a second end of the third resistor R4 is connected to a control end of the first switching tube Q2;

the control end of the first switching tube Q2 is connected to an output end of the expansion circuit;

a second end of the first switching tube Q2 is the output end of the second voltage stabilizing circuit;

the first voltage stabilizing circuit is configured to convert the power supply voltage of the voltage source into a reference voltage, and transmit the reference voltage to the second voltage stabilizing circuit;

the second voltage stabilizing circuit is configured to convert the reference voltage into an input voltage of a preset voltage value;

the expansion circuit is configured to adjust the voltage value of the input voltage based on an environmental factor around the power control circuit.

In the present embodiment, the 10.6V voltage stabilizing output circuit is the first voltage stabilizing circuit, and the 10V voltage stabilizing output sensor and the light control expansion are the second voltage stabilizing circuit.

The present embodiment adjusts and controls the voltage at the control end of the first switching tube Q2 through the expansion circuit, so that after the first voltage stabilizing circuit converts the power supply voltage into the reference voltage, the expansion circuit determines the voltage value of the input voltage that the reference voltage is converted into, thereby changing the power adjustment range of the input voltage in the power adjusting circuit.

Furthermore, the expansion circuit includes: a first diode D1, a second diode D2, and an external sensor module;

wherein an anode of the first diode D1 is connected to the output end of the expansion circuit, and a cathode of the first diode D1 is connected respectively to the external sensor module and a cathode of the second diode D2;

an anode of the second diode D2 is grounded;

the external sensor module is configured to adjust the voltage value at the cathode of the first diode D1 based on an environmental factor; the environmental factor includes one or a combination of the following: pressure, temperature, humidity, and volume.

The present embodiment adjusts and controls the voltage at the control end of the first switching tube Q2 through the expansion circuit, so that after the first voltage stabilizing circuit converts the power supply voltage into a reference voltage, the external sensor module, in combination with the first diode D1 clamp, determines the voltage value of the input voltage that the reference voltage is converted into, thereby changing the power adjustment range of the input voltage in the power adjusting circuit.

Furthermore, the expansion circuit includes: a third diode D5, a fourth diode D4, and a light controller module;

wherein, an anode of the third diode D5 is connected to the output end of the expansion circuit, and a cathode of the third diode D5 is connected respectively to the light controller module and a cathode of the fourth diode D4;

an anode of the fourth diode D4 is grounded;

the light controller module is configured to adjust the voltage value at the cathode of the third diode D1 based on light intensity.

The present embodiment adjusts and controls the voltage at the control end of the first switching tube Q2 through the expansion circuit, so that after the first voltage stabilizing circuit converts the power supply voltage into the reference voltage, the light controller module, in combination with the third diode D5 clamp, determines the voltage value of the input voltage that the reference voltage is converted into, thereby changing the power adjustment range of the input voltage in the power adjusting circuit.

Figure 3:
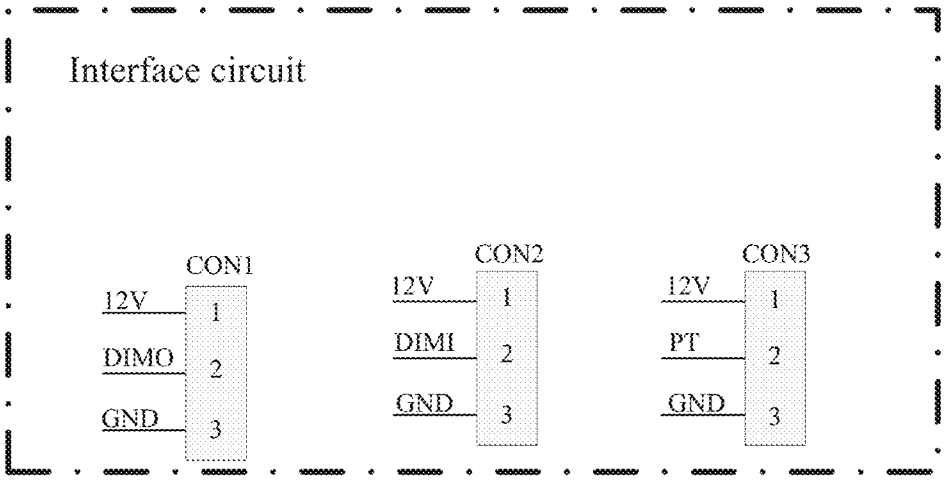
FIG. 3 is a schematic diagram illustrating the structure of an interface circuit according to an embodiment of the present invention.

Please refer to FIG. 3. FIG. 3 is a schematic diagram illustrating the structure of an interface circuit according to an embodiment of the present invention. In this figure, CON1 is an expansion socket of the external sensor module, CON3 is an expansion socket of the light controller module, and CON2 is a 0-10V interface of the LED driver module.

In the present embodiment, when the power adjusting circuit is set to the first level, the voltage at the V-10V point, namely at the output end of the first voltage stabilizing circuit, becomes 10V after passing through the first switching tube Q2. The voltage at the control end of the first switching tube Q2 is determined by the light controller or the external sensor module. If the output of the light controller sensor is V2, the voltage at the control end of the first switching tube Q2 is clamped to V2+0.6V by the first diode D1 or the third diode D5. The voltage at the second end of the first switching tube Q2 is V2, which is the input voltage. By dividing V2 through a 10 kΩ first resistor R6, a 15 kΩ first external resistor, and a 0-50 kΩ second external resistor, the adjustable power is achieved; and the adjustable range is: [V2*(60%-86.7%)]/10V.

In the present embodiment, when the power adjusting circuit is set to the third level, the voltage at the V-10V point, namely at the output end of the first voltage stabilizing circuit, becomes 10V after passing through the first switching tube Q2. The voltage at the control end of the first switching tube Q2 is determined by the light controller or the external sensor module. If the output of the light controller sensor is V2, the voltage at the control end of the first switching tube Q2 is clamped to V2+0.6V by the first diode D1 or the third diode D5. The voltage at the second end of the first switching tube Q2 is V2, which is the input voltage. By dividing V2 through a 10 kΩ first resistor R6, a 5 kΩ first external resistor, and a 0-20 kΩ second external resistor, the adjustable power is achieved; and the adjustable range is: [V2*(33%-72%)]/10V.

In the prior art, the 0-10V port is occupied by the power adjusting module, which results in a situation where if the customer needs to connect another dimmer, then a set of dimming lines would be occupied by multiple functional modules, therefore the multiple functional modules interfere with each other, leading to poor linearity of dimming. The circuits available on the market that use 0-10V are simple, have limited functionality, and are weak in expansibility. In contrast, the second voltage stabilizing circuit in the present invention can have an expansion circuit, which makes it convenient to expand the light control function and sensor function. Furthermore, the present invention can expand the light control and sensor control functions while achieving power adjustment and color temperature adjustment, without interfering with each other.

Furthermore, the first voltage stabilizing circuit includes: a first capacitor C1, a fourth resistor R1, a fifth resistor R2, a sixth resistor R3, a second switching tube Q1, and a first thyristor U1;

wherein a first end of the first capacitor C1 is connected respectively to a first end of the second switching tube Q1 and a first end of the fourth resistor R1, jointly constituting the input end of the first voltage stabilizing circuit;

a second end of the first capacitor C1 is grounded;

a control end of the second switching tube Q1 is connected respectively to a second end of the fourth resistor R1 and a cathode of the first thyristor U1;

a second end of the second switching tube Q1 is connected to a first end of the fifth resistor R2, jointly constituting the output end of the first voltage stabilizing circuit;

a gate of the first thyristor U1 is connected respectively to a second end of the fifth resistor R2 and a first end of the sixth resistor R3, and an anode of the first thyristor U1 is grounded;

a second end of the sixth resistor R3 is grounded;

In the present embodiment, when the input voltage is 12V, and the reference voltage of the first thyristor U1 is 2.5V, the voltage across the first thyristor U1 is adjusted by the voltage division with the fifth resistor R2 and the sixth resistor R3, resulting in the first voltage stabilizing circuit outputting a reference voltage of 10.6V.

In the present embodiment, after receiving the power supply voltage, the first voltage stabilizing circuit first performs filtering through the first capacitor C1 to enhance the stability of circuit operation; then divides the voltage by the fifth resistor R2 and the sixth resistor R3 to provide the preset reference voltage to the gate of the thyristor, and in conjunction with the second switching tube Q1, converts the power supply voltage into the reference voltage of the preset voltage value, so as to achieve the stabilized voltage output; and the fourth resistor R1 prevents excessive current of the second switching tube Q1, further enhancing the stability of circuit operation.

Furthermore, the first voltage stabilizing circuit further includes: a second capacitor C2 and a third capacitor C3;

wherein the first end of the second capacitor C2 is connected to the control end of the second switching tube Q1, and a second end of the second capacitor C2 is connected respectively to the second end of the fifth resistor R2 and a first end of the sixth resistor R3;

a first end of the third capacitor C3 is connected to the second end of the second switching tube Q1, and a second end of the third capacitor C3 is grounded.

The present embodiment further uses the second capacitor C2 and the third capacitor C3 to respectively achieve the low-pass filtering between the second end and the control end of the second switching tube Q1 and the filtering at the output end of the first voltage stabilizing circuit, thereby enhancing the quality of the reference voltage.

Please refer to FIG. 2. FIG. 2 is a schematic diagram illustrating the connection relationships of a power control circuit according to an embodiment of the present invention. In this figure, the 0-10V output circuit is the output circuit in the present embodiment, it includes: a first operational amplifier OP, a seventh resistor R10, and a fifth diode D3;

wherein a non-inverting input end of the first operational amplifier OP is the input end of the output circuit, and an inverting input end of the first operational amplifier OP is connected to a first end of the seventh resistor R10;

a second end of the seventh resistor R10 is connected respectively to an output end of the first operational amplifier OP and a cathode of the fifth diode D3, jointly constituting the output end of the output circuit;

an anode of the fifth diode D3 is grounded;

In the present embodiment, the output circuit further includes: an eighth resistor R9, wherein a first end of the eighth resistor R9 is connected to the output end of the first operational amplifier OP, and a second end of the eighth resistor R9 is connected to the anode of the fifth diode D3.

In the present embodiment, the output circuit further includes: a fourth capacitor C5, wherein the positive input end of the first operational amplifier OP is connected respectively to a first end of the fourth capacitor C5 and working power supply, and the second end of the fourth capacitor C5 is grounded; the voltage value of the working power supply is 12V.

In the present embodiment, the output voltage of the power adjusting circuit passes through the non-inverting input end of the first operational amplifier OP, then the voltage is followed and outputted to the 0-10V interface of the LED driver module, thereby achieving the adjustment of luminaire's power.

In the present embodiment, the first operational amplifier OP follows the output voltage through a feedback loop provided by the seventh resistor R10, and in conjunction with the fifth diode D3, outputs the brightness control voltage required for the dimming interface.

Figure 4:
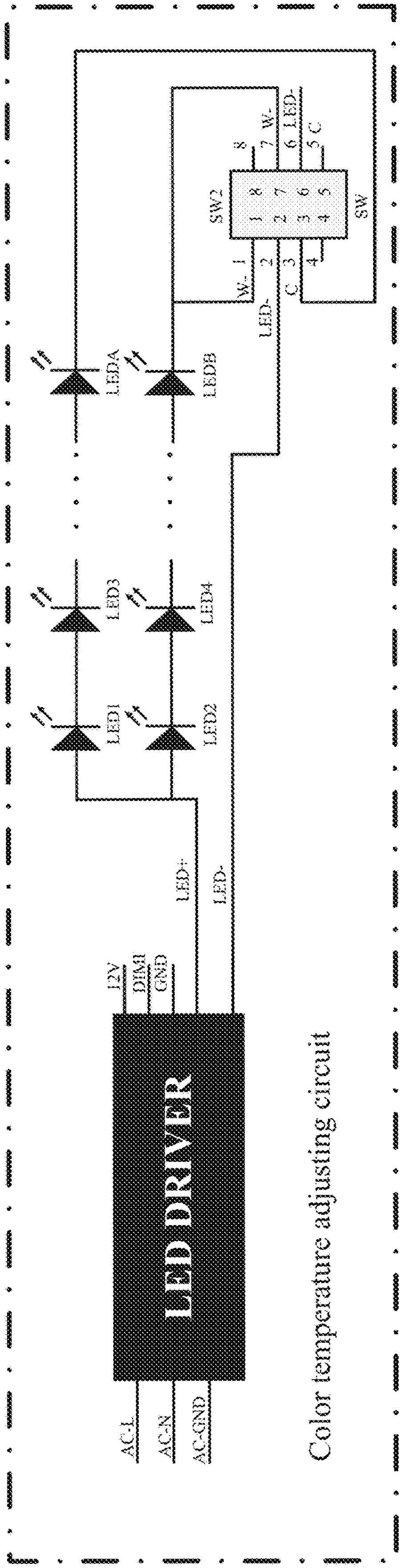
FIG. 4 is a schematic diagram illustrating the connection relationships of a color temperature adjusting circuit according to an embodiment of the present invention.

In another aspect, the embodiments of the present invention further provide a dimming control circuit, including: a power control circuit as described in the embodiments of the present invention and a color temperature adjusting circuit. Please refer to FIG. 4. FIG. 4 is a schematic diagram illustrating the connection relationships of a color temperature adjusting circuit according to an embodiment of the present invention. In this figure, the LED DRIVER is the LED driver module; the color temperature adjusting circuit includes: an LED driver module, a cool white LED array, a warm white LED array, and a color temperature DIP switch SW2;

the power control circuit is connected to an input end of the LED driver module through the output end of the output circuit;

a first output end of the LED driver module is connected respectively to a first end of the cool white LED array and a first end of the warm white LED array;

a color temperature DIP switch SW2 is connected respectively to a second output end of the LED driver module, a second end of the cool white LED array, and a second end of the warm white LED array.

The present embodiment first utilizes the power supply voltage stabilizing circuit to converts the power supply voltage into the input voltage required for controlling the LED light; then adjusts the voltage division ratio of the voltage division resistor in the power adjusting circuit to achieve power adjustment of the output voltage; so as to ensure that the brightness control voltage obtained after operationally amplifying and following the output voltage can satisfy the power match for different dimming interfaces.

The specific embodiments described above provide further detailed explanation of the objectives, technical solutions, and beneficial effects of the present invention. It should be understood that the above description is only for specific embodiments of the present invention and is not intended to limit the scope of the protection of the present invention. It is particularly noted that for those skilled in the art, any modifications, equivalent replacements, improvements, and the like made within the spirit and principles of the present invention should be included within the scope of protection of the present invention.

The invention claimed is:

1. A power control circuit, comprising: a power supply voltage stabilizing circuit, a power adjusting circuit, and an output circuit; the power adjusting circuit comprises: a voltage division resistor;

wherein, an input end of the power supply voltage stabilizing circuit is connected to a voltage source, and an output end of the power supply voltage stabilizing circuit is connected to an input end of the power adjusting circuit;

an output end of the power adjusting circuit is connected to an input end of the output circuit;

an output end of the output circuit is connected to an LED driver module;

the power supply voltage stabilizing circuit is configured to convert a power supply voltage of the voltage source into an input voltage of a preset voltage value, and transmit the input voltage to the power adjusting circuit;

the power adjusting circuit is configured to convert the input voltage into an output voltage of a preset power by adjusting a voltage division ratio of the voltage division resistor;

the output circuit is configured to operationally amplify and follow the output voltage, and output a brightness control voltage.

2. The power control circuit as claimed in claim 1, wherein the power adjusting circuit further comprises: a level control module; wherein the voltage division resistor comprises: a first resistor and a second resistor;

a first end of the first resistor is the input end of the power adjusting circuit, and a second end of the first resistor is connected respectively to a control end of the level control module and a first end of the second resistor;

a second end of the second resistor is grounded;

the control end of the level control module and the first end of the second resistor jointly constitute the output end of the power adjusting circuit;

the level control module is configured to, in accordance with a user-set level, parallelly connect an external resistor corresponding to the level to the second resistor.

3. The power control circuit as claimed in claim 2, wherein the level control module comprises: a plurality of external resistor branches and a power DIP switch; wherein each of the plurality of external resistor branches comprises a first external resistor and a second external resistor; the second external resistor is an adjustable resistor;

wherein, a first end of each of the plurality of external resistor branches is the control end of the level control module, a second end of each of the plurality of external resistor branches is connected to the power DIP switch;

in each of the plurality of external resistor branches, a first end of the first external resistor is the first end of the external resistor branch, and a second end of the first external resistor is connected to the first end of the second external resistor; and an adjustment end of the second external resistor is the second end of the external resistor branch.

4. The power control circuit as claimed in claim 1, wherein the power supply voltage stabilizing circuit comprises: a first voltage stabilizing circuit and a second voltage stabilizing circuit; wherein the second voltage stabilizing circuit comprises: a first switching tube, a third resistor, and an expansion circuit;

an input end of the first voltage stabilizing circuit is the input end of the power supply voltage stabilizing circuit, and an output end of the first voltage stabilizing circuit is connected to an input end of the second voltage stabilizing circuit;

an output end of the second voltage stabilizing circuit is the output end of the power supply voltage stabilizing circuit;

a first end of the first switching tube is connected to a first end of the third resistor, and the first end of the first switching tube is the input end of the second voltage stabilizing circuit;

a second end of the third resistor is connected to a control end of the first switching tube;

the control end of the first switching tube is connected to an output end of the expansion circuit;

a second end of the first switching tube is the output end of the second voltage stabilizing circuit;

the first voltage stabilizing circuit is configured to convert the power supply voltage of the voltage source into a reference voltage, and transmit the reference voltage to the second voltage stabilizing circuit;

the second voltage stabilizing circuit is configured to convert the reference voltage into the input voltage of the preset voltage value;

the expansion circuit is configured to adjust the voltage value of the input voltage based on an environmental factor around the power control circuit.

5. The power control circuit as claimed in claim 4, wherein the expansion circuit comprises: a first diode, a second diode, and an external sensor module;

wherein an anode of the first diode is connected to the output end of the expansion circuit, and a cathode of the first diode is connected respectively to the external sensor module and a cathode of the second diode;

an anode of the second diode is grounded;

the external sensor module is configured to adjust the voltage value at the cathode of the first diode based on an environmental factor; the environmental factor comprises one or a combination of the following: pressure, temperature, humidity, and volume.

6. The power control circuit as claimed in claim 4, wherein the expansion circuit comprises: a third diode, a fourth diode, and a light controller module;

wherein an anode of the third diode is connected to the output end of the expansion circuit, and a cathode of the third diode is connected respectively to the light controller module and a cathode of the fourth diode;

an anode of the fourth diode is grounded;

the light controller module is configured to adjust the voltage value at the cathode of the third diode based on light intensity.

7. The power control circuit as claimed in claim 4, wherein the first voltage stabilizing circuit comprises: a first capacitor, a fourth resistor, a fifth resistor, a sixth resistor, a second switching tube, and a first thyristor;

wherein a first end of the first capacitor is connected respectively to a first end of the second switching tube and a first end of the fourth resistor, jointly constituting the input end of the first voltage stabilizing circuit;

a second end of the first capacitor is grounded;

a control end of the second switching tube is connected respectively to a second end of the fourth resistor and a cathode of the first thyristor;

a second end of the second switching tube is connected to a first end of the fifth resistor, jointly constituting the output end of the first voltage stabilizing circuit;

a gate of the first thyristor is connected respectively to a second end of the fifth resistor and a first end of the sixth resistor, and an anode of the first thyristor is grounded;

a second end of the sixth resistor is grounded.

8. The power control circuit as claimed in claim 7, wherein the first voltage stabilizing circuit further comprises: a second capacitor and a third capacitor;

wherein a first end of the second capacitor is connected to the control end of the second switching tube, and a second end of the second capacitor is connected respectively to the second end of the fifth resistor and the first end of the sixth resistor;

a first end of the third capacitor is connected to the second end of the second switching tube, and a second end of the third capacitor is grounded.

9. The power control circuit as claimed in claim 1, wherein the output circuit comprises: a first operational amplifier, a seventh resistor, and a fifth diode;

wherein a non-inverting input end of the first operational amplifier is the input end of the output circuit, and an inverting input end of the first operational amplifier is connected to a first end of the seventh resistor;

a second end of the seventh resistor is connected respectively to an output end of the first operational amplifier and a cathode of the fifth diode, jointly constituting the output end of the output circuit;

an anode of the fifth diode is grounded.

10. The power control circuit as claimed in claim 2, wherein the output circuit comprises: a first operational amplifier, a seventh resistor, and a fifth diode;

wherein a non-inverting input end of the first operational amplifier is the input end of the output circuit, and an inverting input end of the first operational amplifier is connected to a first end of the seventh resistor;

a second end of the seventh resistor is connected respectively to an output end of the first operational amplifier and a cathode of the fifth diode, jointly constituting the output end of the output circuit;

an anode of the fifth diode is grounded.

11. The power control circuit as claimed in claim 3, wherein the output circuit comprises: a first operational amplifier, a seventh resistor, and a fifth diode;

wherein a non-inverting input end of the first operational amplifier is the input end of the output circuit, and an inverting input end of the first operational amplifier is connected to a first end of the seventh resistor;

a second end of the seventh resistor is connected respectively to an output end of the first operational amplifier and a cathode of the fifth diode, jointly constituting the output end of the output circuit;

an anode of the fifth diode is grounded.

12. The power control circuit as claimed in claim 4, wherein the output circuit comprises: a first operational amplifier, a seventh resistor, and a fifth diode;

wherein a non-inverting input end of the first operational amplifier is the input end of the output circuit, and an inverting input end of the first operational amplifier is connected to a first end of the seventh resistor;

a second end of the seventh resistor is connected respectively to an output end of the first operational amplifier and a cathode of the fifth diode, jointly constituting the output end of the output circuit;

an anode of the fifth diode is grounded.

13. The power control circuit as claimed in claim 5, wherein the output circuit comprises: a first operational amplifier, a seventh resistor, and a fifth diode;

wherein a non-inverting input end of the first operational amplifier is the input end of the output circuit, and an inverting input end of the first operational amplifier is connected to a first end of the seventh resistor;

a second end of the seventh resistor is connected respectively to an output end of the first operational amplifier and a cathode of the fifth diode, jointly constituting the output end of the output circuit;

an anode of the fifth diode is grounded.

14. The power control circuit as claimed in claim 6, wherein the output circuit comprises: a first operational amplifier, a seventh resistor, and a fifth diode;

wherein a non-inverting input end of the first operational amplifier is the input end of the output circuit, and an inverting input end of the first operational amplifier is connected to a first end of the seventh resistor;

a second end of the seventh resistor is connected respectively to an output end of the first operational amplifier and a cathode of the fifth diode, jointly constituting the output end of the output circuit;

an anode of the fifth diode is grounded.

15. A dimming control circuit, comprising: the power control circuit according to claim 1 and a color temperature adjusting circuit; wherein the color temperature adjusting circuit comprises: the LED driver module, a cool white LED array, a warm white LED array, and a color temperature DIP switch;

the power control circuit is connected to an input end of the LED driver module through the output end of the output circuit;

a first output end of the LED driver module is connected respectively to a first end of the cool white LED array and a first end of the warm white LED array;

the color temperature DIP switch is connected respectively to a second output end of the LED driver module, a second end of the cool white LED array, and a second end of the warm white LED array.

* * * * *